(12) United States Patent
Park et al.

(10) Patent No.: US 9,178,206 B2
(45) Date of Patent: *Nov. 3, 2015

(54) BATTERY MODULE

(75) Inventors: Shi-Dong Park, Yongin-si (KR);
Tae-Yong Kim, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 917 days.

This patent is subject to a terminal disclaimer.

(21) Appl. No.: 13/064,761

(22) Filed: Apr. 13, 2011

(65) Prior Publication Data

US 2012/0115014 A1 May 10, 2012

(30) Foreign Application Priority Data

Nov. 5, 2010 (KR) .................. 10-2010-0109805

(51) Int. Cl.
| | |
|---|---|
| H01M 2/24 | (2006.01) |
| H01M 2/30 | (2006.01) |
| H01M 10/42 | (2006.01) |
| H01M 2/12 | (2006.01) |
| H01M 2/20 | (2006.01) |
| H01M 2/32 | (2006.01) |
| H01M 10/0525 | (2010.01) |
| H01M 2/10 | (2006.01) |

(52) U.S. Cl.
CPC .............. *H01M 2/30* (2013.01); *H01M 2/1211* (2013.01); *H01M 2/206* (2013.01); *H01M 2/24* (2013.01); *H01M 2/32* (2013.01); *H01M 10/0525* (2013.01); *H01M 10/4207* (2013.01); *H01M 2/1077* (2013.01); *Y02E 60/122* (2013.01); *Y02T 10/7011* (2013.01)

(58) Field of Classification Search
CPC ..... H01M 2/206; H01M 2/24; H01M 2/1211; H01M 10/4207
USPC .................................... 429/159, 160
See application file for complete search history.

(56) References Cited

U.S. PATENT DOCUMENTS

| | | |
|---|---|---|
| 5,576,516 A | 11/1996 | Kameyana et al. |
| 8,329,331 B2 | 12/2012 | Han |
| 2004/0043663 A1* | 3/2004 | Ikeda et al. ............ 439/627 |
| 2005/0069759 A1 | 3/2005 | Shimamura et al. |
| 2009/0053591 A1* | 2/2009 | Ikeda et al. ............ 429/159 |
| 2010/0143786 A1 | 6/2010 | Kim |

(Continued)

FOREIGN PATENT DOCUMENTS

| | | |
|---|---|---|
| EP | 1030387 A1 | 8/2000 |
| JP | 2005-129487 | 5/2005 |

(Continued)

OTHER PUBLICATIONS

Partial European Search Report dated Jun. 6, 2014.

(Continued)

*Primary Examiner* — Jonathan Jelsma
(74) *Attorney, Agent, or Firm* — Lee & Morse, P.C.

(57) ABSTRACT

A battery module includes a plurality of rechargeable batteries respectively including externally protruded terminals, a bus-bar electrically coupling at least two of the terminals of the rechargeable batteries, and a protection member disposed between the bus-bar and the rechargeable batteries, and including a protruding portion formed along a circumference of the bus-bar.

21 Claims, 7 Drawing Sheets

(56) References Cited

U.S. PATENT DOCUMENTS

| | | |
|---|---|---|
| 2010/0279156 A1 | 11/2010 | Kim et al. |
| 2011/0076521 A1* | 3/2011 | Shimizu et al. ............... 429/7 |
| 2011/0293973 A1* | 12/2011 | Kim ............................. 429/53 |
| 2012/0114991 A1* | 5/2012 | Park et al. .................... 429/82 |

FOREIGN PATENT DOCUMENTS

| | | |
|---|---|---|
| JP | 2007-027011 | 2/2007 |
| JP | 2007-323951 | 12/2007 |
| JP | 2007-324004 | 12/2007 |
| JP | 2010-033913 A | 2/2010 |
| KR | 10-2007-0080871 A | 8/2007 |
| KR | 10-2008-0004910 A | 1/2008 |
| KR | 10-2009-0000301 A | 1/2009 |
| KR | 10-2009-0048860 A | 5/2009 |
| KR | 10-2010-0041442 A | 4/2010 |

OTHER PUBLICATIONS

European Search Report dated Feb. 25, 2014.
Extended European Search Report dated Feb. 11, 2015 for EP 11162930.9 (Park, et al.).

* cited by examiner

BATTERY MODULE

BACKGROUND

1. Field

The described technology relates generally to a battery module. More particularly, the described technology relates generally to a battery module with an improved structure of protecting a bus-bar.

2. Description of the Related Art

A rechargeable battery differs from a primary battery in that it can be repeatedly charged and discharged, while the latter makes only the irreversible conversion of chemical to electrical energy. The low-capacity rechargeable battery is used as the power supply for small electronic devices, such as cellular phones, notebook computers and camcorders, while the high-capacity rechargeable battery is used as the power supply for driving motors in hybrid vehicles and the like.

Recently, a high power rechargeable battery that includes a non-aqueous electrolyte having a high energy density has been developed, and is constituted by a large capacity rechargeable battery in which a plurality of rechargeable batteries are coupled in series in order to use it to drive devices requiring a large amount of power, for example, motors such as for electric vehicles.

In addition, a large capacity rechargeable battery generally includes a plurality of rechargeable batteries that are coupled in series, and the rechargeable battery may be formed of cylindrical and angular shapes.

The above information disclosed in this Background section is only for enhancement of understanding of the background of the described technology and therefore it may contain information that does not form the prior art that is already known in this country to a person of ordinary skill in the art.

SUMMARY

According to an exemplary embodiment, there is provided a battery module including a plurality of rechargeable batteries respectively including externally protruding terminals, a bus-bar electrically coupling at least two of the terminals of the rechargeable batteries, and a protection member between the bus-bar and the rechargeable batteries, and including a protruding portion disposed along a circumference of the bus-bar.

The battery module may further include a housing in which the rechargeable batteries are installed, and the protection member may be disposed on the housing.

The protection member may further include a support plate disposed on a case of the rechargeable batteries. The support plate may include holes through which the terminals extend. The support plate may include a pressing protrusion contacting a bottom surface of the bus-bar.

The protruding portion may be formed in the shape of a rib surrounding the bus-bar.

The protruding portion may include a protection protrusion surrounding the bus-bar and including a gap and a guiding protrusion extending from ends of the protection protrusion corresponding to the gap toward a center of the support plate in a width direction.

The protection member may include an exhaust hole corresponding to an upper portion of an exhaust member formed in the rechargeable battery.

An exhaust protrusion may protrude upward along a circumference of the exhaust hole.

The support plate may include a pressing protrusion contacting a bottom surface of the bus-bar.

An end portion of the pressing protrusion may protrude farther in a direction of an end portion of one of the terminals than a bottom side of a portion of the bus-bar that contacts the terminal.

The bus-bar may be bent by the pressing protrusion.

A shear stress may be applied to the bus-bar by the pressing protrusion.

Two pressing protrusions may be separately disposed from each other under one bus-bar.

The bus-bar may electrically couple four or more rechargeable batteries and a height of a pressing protrusion pressing an end side of the bus-bar in a length direction may be higher than a height of a pressing protrusion pressing a center portion of the bus-bar in the length direction.

The bus-bar may be deformed by a plurality of pressing protrusions, and when a strain at the center portion of the bus-bar is represented by "em", a strain at the edge that is disposed further to an side than the center portion in the length direction of the bus-bar is represented by "es", and a strain in elastic limit is represented by "el," em, es and el satisfy the relation: em<es<el.

The bus-bar may be deformed by a plurality of pressing protrusions including first pressing protrusions and at least one second pressing protrusion, the first protrusions being at respective end regions of the bus-bar in a length direction of the bus-bar and the second protrusion being at a center region between the first protrusions, and when an angle formed by the bus-bar and a plane that is parallel with an upper side of the support plate at a portion where the bus-bar and one of the first pressing protrusion contact each other is an angle represented by "a1" and an angle formed by the bus-bar and the support plate at a portion where the bus-bar and one of the second pressing protrusion is an angle represented by "a2," a1 and a2 satisfy the relation: a2<a1.

The bus-bar may include holes through which the terminals are inserted, a bottom side of the bus-bar may contact a base member fixed one of the terminals, and an upper side of the bus-bar may contact a nut fastened to the one of the terminals.

The pressing protrusion may protrude farther to a direction toward an end portion of the one of the terminals than an upper side of the base member.

According to an exemplary embodiment, there is provided a battery module including a plurality of rechargeable batteries respectively including externally protruded terminals, a bus-bar electrically coupling neighboring rechargeable batteries, and a pressing protrusion disposed under the bus-bar, the pressing protrusion being in contact with the bus-bar.

An end portion of the pressing protrusion may protrude farther in a direction toward an end portion of one of the terminal than a bottom side of a portion of the bus-bar that contacts the terminal.

The bus-bar may be bent by the pressing protrusion.

A shear stress may be applied to the bus-bar by the pressing protrusion.

The bus-bar may electrically couple the plurality of rechargeable batteries, a plurality of pressing protrusions may be disposed to be in contact with the bus-bar, and a height of a pressing protrusion pressing an end portion of the bus-bar in a length direction may be higher than a height of a pressing protrusion pressing a center portion of the bus-bar.

The pressing protrusions may be respectively disposed between terminals coupled by the bus-bar.

Each of the pressing protrusions may include a support plate contacting an upper side of the rechargeable battery, a supporting portion that protrudes from a bottom side of the support plate and extends between cases of the rechargeable batteries, and an upper pressing portion that protrudes from the support plate.

BRIEF DESCRIPTION OF THE DRAWINGS

The embodiments will become more apparent to those of ordinary skill in the art by describing in detail exemplary embodiments with reference to the attached drawings, in which.

DETAILED DESCRIPTION

Korean Patent Application No. 10-2010-0109805, filed on Nov. 5, 2010, in the Korean Intellectual Property Office, and entitled: "Battery Module," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Like reference numerals refer to like elements throughout.

Figure 1:
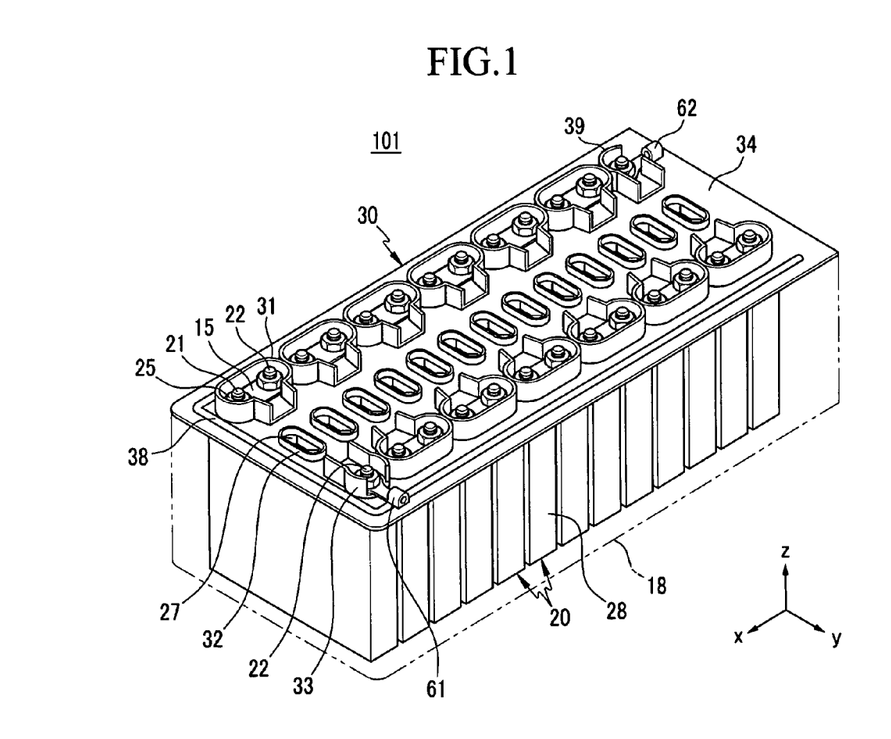
FIG. 1 illustrates a perspective view of a battery module according to an exemplary embodiment.
Figure 2:
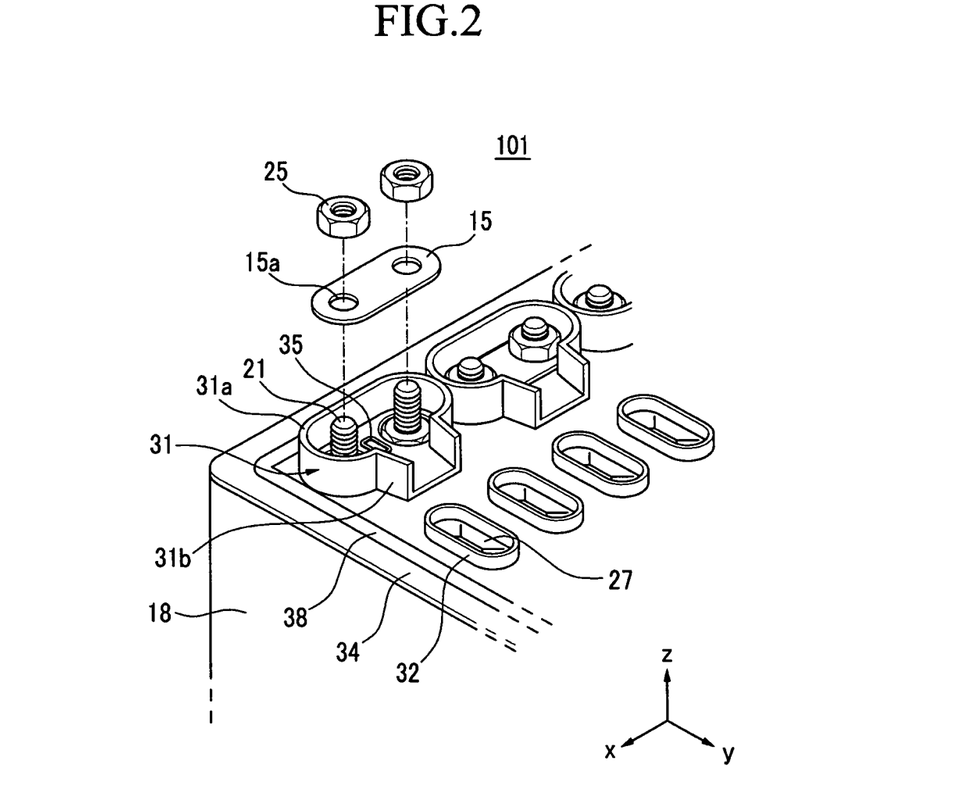
FIG. 2 illustrates an exploded perspective view of the battery module according to the exemplary embodiment of FIG. 1.

FIG. 1 illustrates a perspective view of a battery module according to an exemplary embodiment and FIG. 2 illustrates an exploded perspective view of the battery module according to the exemplary embodiment.

Referring to FIG. 1 and FIG. 2, a battery module 101 according to the present exemplary embodiment includes a plurality of rechargeable batteries 20, a bus bar 15 electrically coupling the rechargeable batteries 20, and a protection member 30 provided above the rechargeable batteries 20.

The rechargeable battery 20 is exemplarily described as a quadrangle or prismatic-type lithium ion rechargeable battery. However, without being limited thereto, embodiments may be applicable to various types of batteries such as a lithium polymer battery, and various configurations such as a cylindrical battery, and the like.

The rechargeable battery 20 includes a case 28 in which an electrode assembly (not shown) is installed and terminals 21 and 22 protruding to the outside of the case 28. In addition, the rechargeable battery 20 further includes an exhaust member 27 including a notch that is formed to be opened at a predetermined pressure to emit gas. The terminals 21 and 22 may be a positive terminal 21 electrically connected with a positive electrode of the electrode assembly and a negative terminal 22 electrically connected with a negative electrode of the electrode assembly.

The case 28 may have a substantially cubic prismatic shape, and may include a metal such as aluminum or an aluminum alloy. The positive electrode 21 and the negative electrode 22 may protrude from an upper portion of the rechargeable battery 20.

The plurality of rechargeable batteries 20 may be layered or arranged with each other in parallel along a side direction (x-axis direction of FIG. 1) such that wide front sides of the rechargeable batteries 20 face each other.

The rechargeable batteries 20 may be coupled in series by bus-bars 15. Positive electrodes 21 and negative electrodes 22 of neighboring rechargeable batteries 20 may be arranged in a crossed manner and a bus-bar 15 may be provided to positive terminals 21 of one rechargeable battery 20 and negative electrodes 22 of its neighboring rechargeable battery 20

The bus-bar 15 may include holes 15a formed at respective edges or end portions thereof in a length direction for insertion of the terminals. After the bus-bar 15 is fitted on a base member 24 (see FIG. 4) fastened to the terminals 21 and 22, the bus-bar 15 may be fixed to the terminals by a nut 25. The base member 24 may also be in the form of a nut fastened to the terminals. Thus, the bottom side of the bus-bar 15 contacts the base member 24 and the upper side thereof contacts the nut 25.

The protecting member 30 may be disposed between the rechargeable batteries 20 and the bus-bar 15, and may include a support plate 34 in the shape of a plate and a protruding portion 31 that protrudes from the support plate 34 around a circumference of the bus-bar 15.

Figure 3:
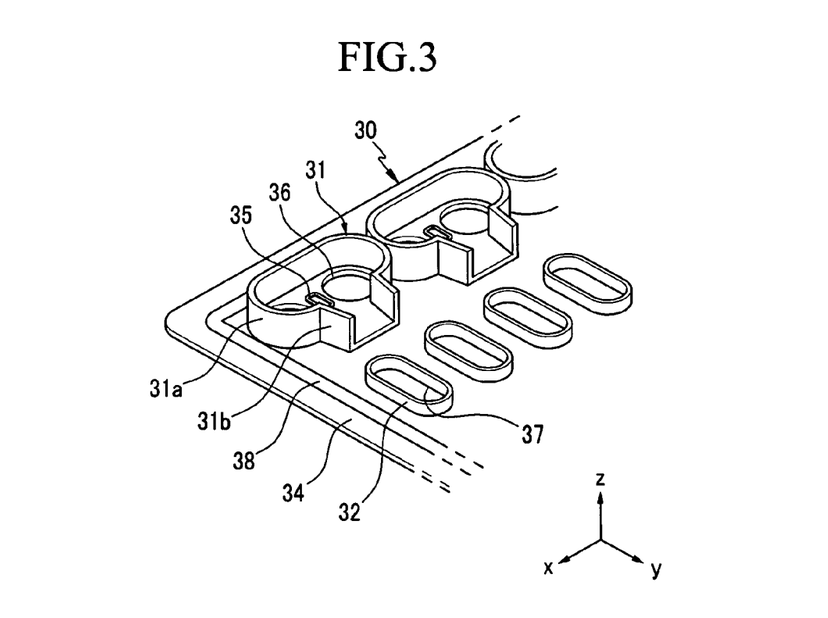
FIG. 3 illustrates a partial perspective view of a supporting member according to the exemplary embodiment.
Figure 4:
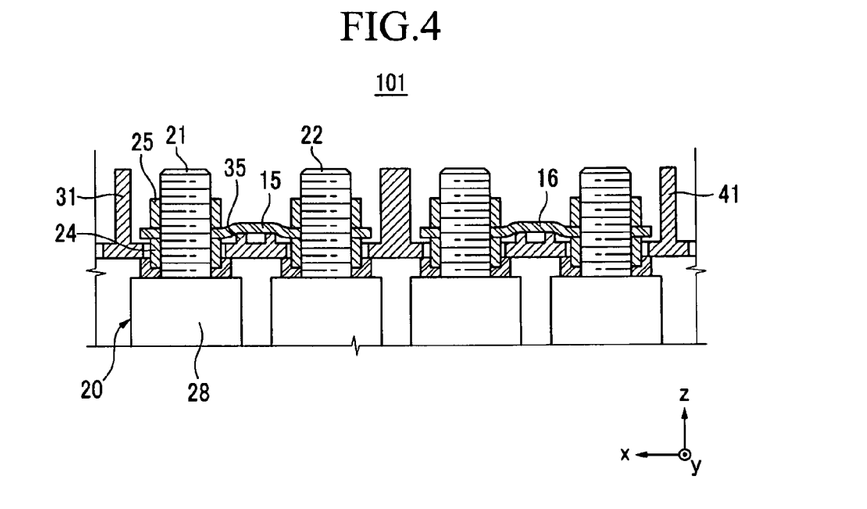
FIG. 4 illustrates a partial cross-sectional view of the battery module according to the exemplary embodiment.

FIG. 3 illustrates a partial perspective view of a supporting member according to the exemplary embodiment. FIG. 4 illustrates a partial cross-sectional view of the battery module according to the exemplary embodiment. As shown in FIG. 3, the support plate 34 may be substantially formed in the shape of a square or rectangular plate. Other shapes are possible. For example, the shape of the support plate 34 may be selected according to the shape and number of rechargeable batteries 20 in the battery module 101. The protecting member 30 may be combined to an opening of a housing 18 where the rechargeable batteries 20 are installed and then fixed to the housing 18 by a bolt (not shown) and the like.

The support plate 34 may include holes 36 through which the terminals 21 and 22 are inserted. The holes 36 may be formed at an inner side of the protruding portion 31. The bus-bar 15 may couple two rechargeable batteries 20 in series. Two holes 36 may be formed inwardly from the protruding portion 31.

The protruding portion 31 may include a protection protrusion 31a formed in the shape of a rib surrounding the bus-bar 15. The protruding portion may include a gap and a guiding protrusion 31b may extend from the protection protrusion 31a toward a center of the support plate 34. The protection protrusion 31a may be formed of arc portions formed at end regions and a straight line portion connecting the arc portions such that the protection protrusion 31a surrounds the bus-bar 15. Accordingly, short-circuit between the bus-bar 15 and its neighboring bus-bar 15 can be prevented. A conductive object such as a tool can be prevented from accidentally being connected with the terminals 21 and 22 or the bus-bar 15. The guiding protrusion 31b may be connected with the terminals 21 and 22 or the bus-bar 15 to protect an electric wire that measures current and voltage levels.

Output terminals 61 and 62 are respectively provided at end portions of the battery module 101 to emit a current to the outside. The output terminals 61 and 62 are not connected with the bus-bar 15. Protruding portions 33 and 39 formed in the shape of a rib protruding from the support plate 34 are formed around the output terminals 61 and 62 to protect the output terminals 61 and 62.

A reinforcement rib 38 may be formed in the support plate 34, protruding along a circumference thereof. The reinforcement rib 38 prevents the support plate 34 from being deformed or damaged due to external impact.

The support plate 34 may include an exhaust hole 37 formed to correspond to an upper portion of the exhaust member 27 formed in the rechargeable battery 20. An exhaust protrusion 32 may be formed at a circumference of the exhaust hole 37, and the exhaust protrusion 32 may extend along the circumference of the exhaust hole 37. Accordingly, when the exhaust member 26 is opened, the internal gas of the rechargeable battery 20 can be promptly emitted with guidance of the exhaust hole 37 and the exhaust protrusion 32.

As shown in FIG. 3 and FIG. 4, a pressing protrusion 35 contacting the bus-bar 15 may be formed between the holes 36 in the support plate 34 through which the terminals 21 and 22 are inserted. The pressing protrusion 35 may protrude farther in a direction toward the end portions of the terminals 21 and 22 than the upper side of the base member 24 such that the pressing protrusion 35 presses the fixed bus-bar 15. For example, a height of the pressing protrusion may be greater than a height of the base member 24. The bus-bar 15 may be fixed to the terminals 21 and 22 by the nut 25. Accordingly, the end portion of the pressing protrusion 35 may protrude farther to the direction toward the end portion of the terminals 21 and 22 than the bottom side of the bus-bar 15, contacting the terminals 21 and 22. Accordingly, a shear stress is applied to the bus-bar 15, and thus the bus-bar 15 is curved.

As described, when the bus-bar 15 is pressed by forming the pressing protrusion 35, the shear stress applied to the bus-bar 15 is transferred to the nut 25 so that the pressed nut 25 cannot be easily loosened when an external impact or vibration is applied thereto, and accordingly, the bus-bar 15 can be stably supported. Thus, electrical connection between the terminals 21 and 22 and the bus-bar 15 can be stably maintained.

In the present exemplary embodiment, two pressing protrusions 35 may be formed at a portion adjacent to the holes 36, and accordingly much stronger pressure can be transferred to the nut 25. The pressing protrusions 35 may be connected to each other at their ends such that the pressing protrusions 35 are substantially formed in the shape of a ring.

Figure 5:
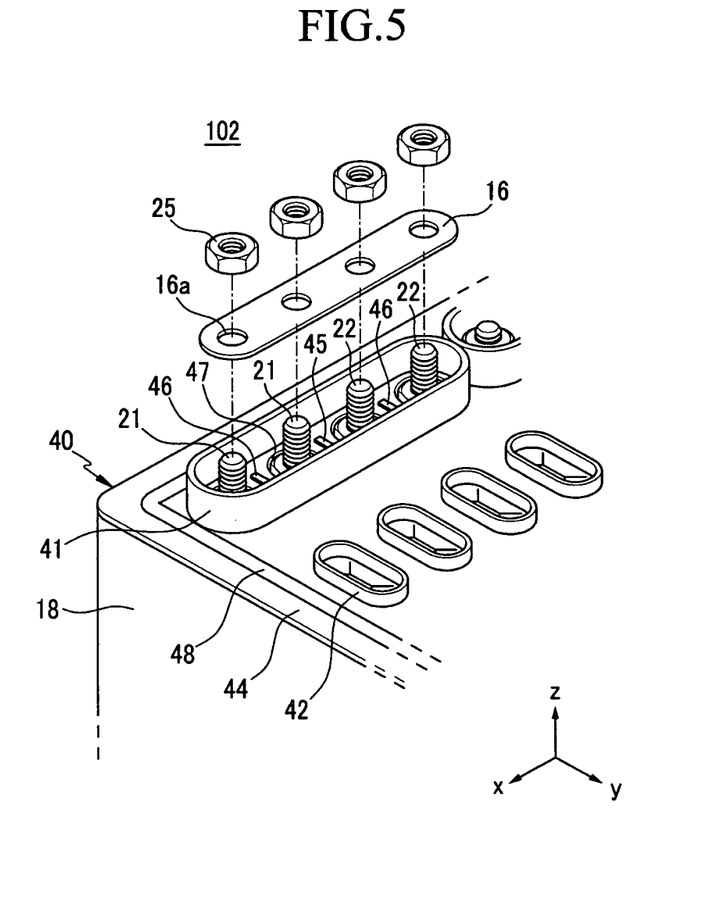
FIG. 5 illustrates a partial exploded perspective view of a battery module according to another exemplary embodiment.
Figure 6:
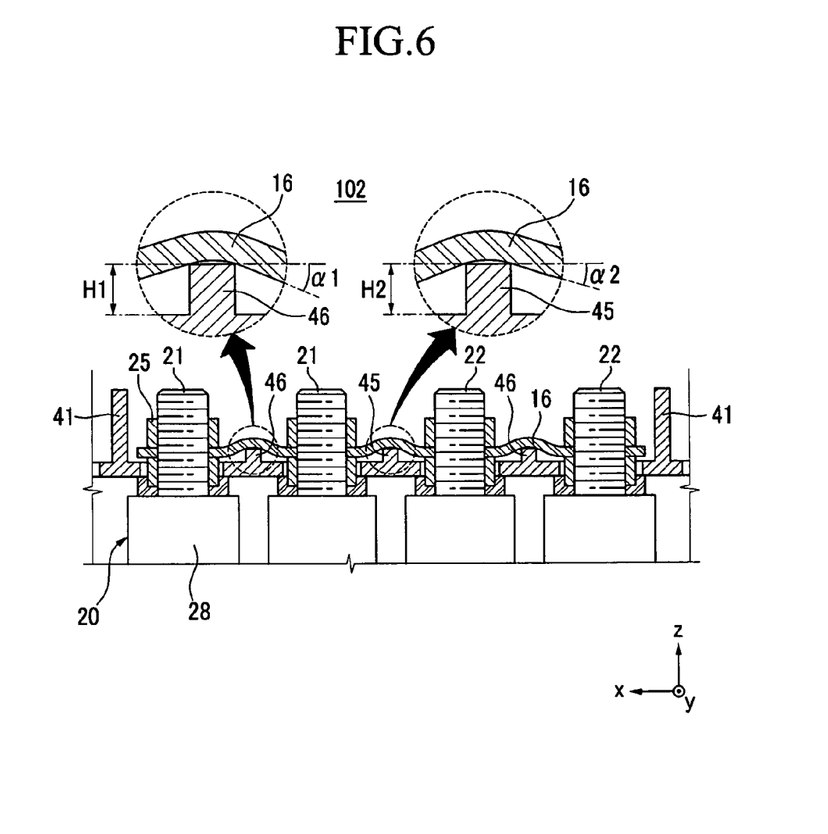
FIG. 6 illustrates a partial cross-sectional view of the battery module according to the exemplary embodiment of FIG. 5.

FIG. 5 illustrates a partial exploded perspective view of a battery module according to another exemplary embodiment, and FIG. 6 illustrates a partial cross-sectional view of the battery module according to the exemplary embodiment of FIG. 5.

Referring to FIG. 5 and FIG. 6, a battery module 102 according to this exemplary embodiment includes a plurality of rechargeable batteries 20, a bus-bar 16 electrically connecting the rechargeable batteries 20, and a protection member 40 disposed on the rechargeable batteries 20.

The battery module 102 according to the present exemplary embodiment is the same as the battery module of the first exemplary embodiment, excluding configurations of a bus-bar 16 and a protection member 40, and therefore a description of the same parts will not be repeated.

Four of the plurality of rechargeable batteries 20 may be electrically coupled by one bus-bar 16. For example, two pairs of the rechargeable batteries 20 may each be coupled in parallel and the two pairs may be coupled in series. Positive terminals 21 of the two rechargeable batteries 20 may be arranged adjacent to each other and negative terminals 22 of the two rechargeable batteries 20 are arranged adjacent to each other, and the bus-bar 16 is combined with the arrangement. To provide this arrangement, four holes 16a may be formed in the bus-bar 16, and the terminals 21 and 22 may be respectively inserted to the holes 16a. While the bus-bar 16 is in the state of being inserted in the terminals 21 and 22, nuts 25 are respectively coupled to the terminals 21 and 22 such that the bus-bar 16 is fixed to the terminals 21 and 22.

While an implementation in which four rechargeable batteries 20 are electrically coupled by one bus-bar 16 is described herein, it is to be understood that the embodiments are so limited. Any number of terminals 21 and 22 may be connected by a single bus-bar 16 to electrically couple rechargeable batteries 20 in parallel or in a combination of series and parallel.

The protecting member 40 may include a plate-shaped support plate 44 and a protruding portion 41 that protrudes from the support plate 44 and that is formed along a circumference of the bus-bar 16. The support plate 44 may be substantially formed in the shape of a square or rectangular plate. Other shapes are possible. For example, the shape of the support plate 34 may be selected according to the shape and number of rechargeable batteries 20 in the battery module 101. The protecting member 40 may be coupled to an opening of the housing 18 in which the rechargeable batteries 20 are installed and then fixed to the housing 18 by a bolt and the like.

Holes 47 formed in the support plate 44 for insertion of the terminals 21 and 22 therein may be disposed inwardly from the protruding portion 41. The bus-bar 16 electrically couples each four of rechargeable batteries 20. The protecting member 40 may have four holes 47 formed inwardly from the protruding portion 41.

The protruding portion 41 may be formed in the shape of a rib surrounding the bus-bar 16. The protruding portion 41 may be formed of arc portions formed at both edges or end portions thereof and straight line portions connecting the arc portions. Accordingly, a short-circuit between one bus-bar 16 and its neighboring bus-bar 16 can be prevented, and a conductive object such as a tool can be prevented from accidentally being connected with the terminals 21 and 22 or the bus-bar 16.

A reinforcement rib 48 may be formed in the support plate 44, protruding along a circumference thereof. The support plate 44 may include an exhaust hole formed to correspond to an upper portion of the exhaust member 27 formed in the rechargeable battery 20. A rib-shaped exhaust protrusion 42 may be formed at a circumference of the exhaust hole.

Pressing protrusions 45 and 46 contacting the bus-bar 16 may be formed between the holes 47 in the protecting member 40. The pressing protrusions 45 and 46 are respectively formed between the holes 47. With respect to a bus-bar 16 having four holes 47 arranged in lengthwise direction of the bus-bar 16, a center portion of the bus-bar 16 may be defined as a portion between the two middle holes 47 of the bus-bar 16. Edges or end portions of the bus-bar may be defined as portions between a middle hole 47 and a hole 47 near a respective end of the bus-bar 16. For convenience of description, a pressing protrusion that presses an end portion of the bus-bar may be referred to as a "first pressing protrusion 46," and a pressing protrusion that presses a center portion of the bus-bar may be referred to as a "second pressing protrusion 45." A height H1 of the first pressing protrusions 46, respectively disposed at edges or end portions of the protruding portion 41 is higher than a height H2 of the second pressing protrusion 45, disposed at the center with reference to a length direction of the bus-bar 16. The height H1 of the pressing protrusions 46 disposed at the edges or end portions may be higher by 0.1 mm to 10 mm than the height H2 of the pressing protrusion 45 disposed at the center.

An angle formed by the bus-bar 16 and a plane that is parallel with the upper side of the support plate 44 at a portion where the edge or end portion of the bus-bar 16 in the length direction and the pressing protrusion 46 contact each other may be represented as angle "a1." An angle formed by the bus-bar 16 and the support plate 44 at a portion where the bus-bar 16 and the pressing protrusion 45 formed between the pressing protrusions 46 may be represented as angle "a2." According to an exemplary embodiment, a2<a1. The angle a1 may be greater by 0.1° to 10° than the angle a2.

In addition, a strain at the center portion of the bus-bar 16 may be represented as "em." A strain at the edge or end portion, that is disposed further to the external side than the center portion in the length direction of the bus-bar may be represented as "es." A strain in the elastic limit may be represented as "el." According to an exemplary embodiment, em<es<el. Here, the strain within elastic limit el refers to a strain when plastic deformation of the bus-bar 16 is started.

As described above, the first pressing portions 46 may be disposed at both sides of edges or end portions of the bus-bar 16, adjacent to the two terminals 21 and 22 and the second pressing portion 45 may be disposed at the center among the four terminals 21 and 22. Accordingly, strong pressing force can be applied to the nuts 25, but edge portions of the bus-bar 16 are respectively pressed at one side thereof such that relatively a weak pressing force is applied to the nuts 25. Further, since the movement of the edge portions is relatively free because they are respectively supported only at one side thereof, the nuts 25 can be easily loosened. However, according to an exemplary embodiment, strong stress may be applied to the nuts 25 at the edge portions to prevent the nuts 25 from being easily loosened so that the bus-bar 16 and the terminals 21 and 22 can be further stably coupled. In addition, the strain of the bus-bar 16 is smaller than the strain within elastic limit el so that pressing force can be stably applied to the nuts 25.

Figure 7:
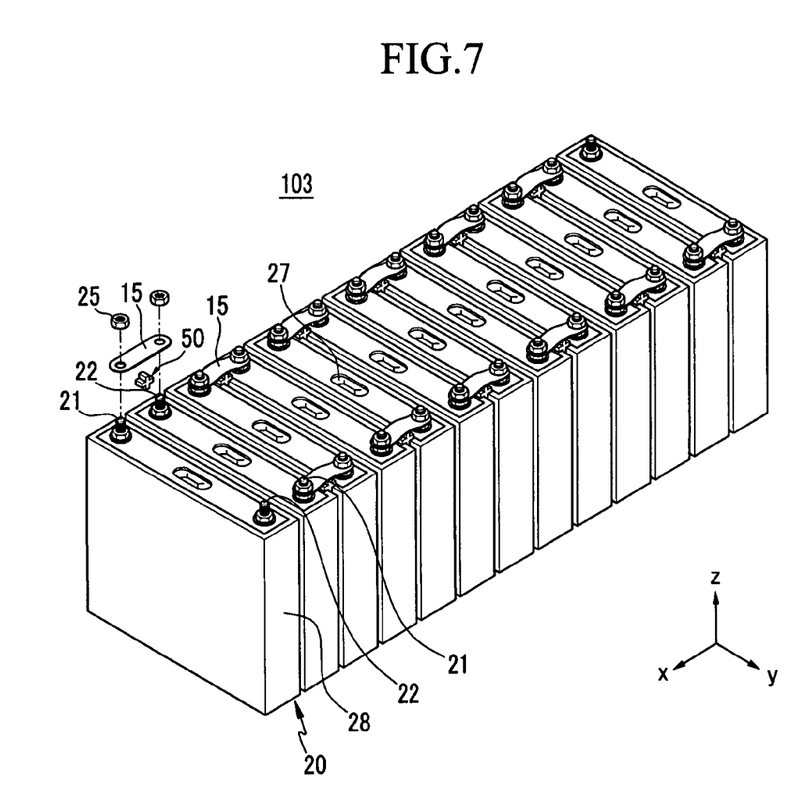
FIG. 7 illustrates an exploded perspective view of a battery module according to another exemplary embodiment.
Figure 8:
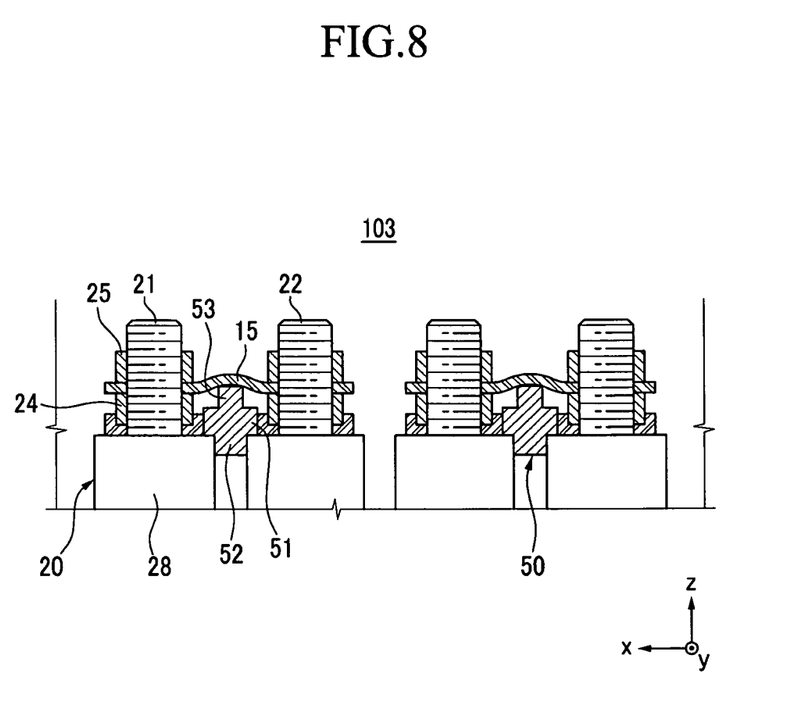
FIG. 8 illustrates a partial cross-sectional view of the battery module according to the exemplary embodiment of FIG. 7.

FIG. 7 illustrates an exploded perspective view of a battery module according to another exemplary embodiment and FIG. 8 illustrates a partial cross-sectional view of the battery module according to the exemplary embodiment of FIG. 7.

Referring to FIG. 7 and FIG. 8, a battery module 103 according to the present exemplary embodiment includes a plurality of rechargeable batteries 20, bus-bars 15 electrically coupling the plurality of rechargeable batteries 20, and pressing protrusions 50 disposed under the bus-bars 15.

The battery module 103 according to the present exemplary embodiment is the same as the battery module of the first exemplary embodiment, excluding that the pressing protrusions 50 are provided instead of protection members, and therefore a description for the same structure will not be repeated.

The rechargeable batteries 20 may be coupled in series by the bus-bars 15. Positive electrodes 21 and negative electrodes 22 of neighboring rechargeable batteries 20 may be arranged in a crossed manner and a bus-bar 15 may be provided to positive terminals 21 of one rechargeable battery 20 and negative electrodes 22 of its neighboring rechargeable battery 20.

For fitting of the terminals, the bus-bar 15 includes holes 15a at both edges or end portions in a length direction thereof. After the bus-bar 15 is fitted onto base members 24 fastened to the respective terminals 21 and 22, the bus-bar 15 is fixed to the terminals by nuts 25. The base members 24 may also be in the form of nuts fastened to the terminals. Thus, a bottom side of the bus-bar contacts the base member 24 and an upper side thereof contacts the nut 25.

Pressing protrusions 50 may be provided between the rechargeable batteries 20. The pressing protrusions 50 are disposed under the bus-bars 15 and press the bus-bars 15 so that the pressing protrusions 50 can closely contact the nuts 25 to the terminals by pressing the nuts 25 through the bus-bar 15.

The pressing protrusion 50 includes a support plate 51 contacting an upper side of the rechargeable battery 20, a lower supporting portion 52 that protrudes from the bottom of the support plate 51 and is inserted between the cases 28 of the rechargeable batteries 20, and an upper pressing portion 53 that protrudes from the support plate 51 and contacts the bus-bar 15. The support plate 50 contacts the upper side of the rechargeable battery 20 and the lower support portion 52 is inserted between the battery cases 28 such that the pressing protrusion 50 can be stably disposed or fixed in position. The upper pressing portion 53 bends the bus-bar 15 by pressing the bus-bar 15. The pressing force applied to the bus-bars 15 is transferred to the nuts 25 and the nuts 25 cannot be easily released from the terminals 21 and 22 so that the nuts 25 can be stably fastened to the terminals 21 and 22.

By way of summation and review, when rechargeable batteries are electrically coupled with each other by a bus-bar, contact resistance may be increased and an output may be decreased when the bus-bar is not stably fixed to the terminals of the rechargeable batteries. Particularly, when the battery module is applied to an electric vehicle and the like, vibration is continuously transferred to the bus-bar and the nut may be loosened due to the vibration, thereby causing contact failure between the terminals and the bus-bar.

Further, since a current flows between the terminals and the bus-bar, short-circuit may be occurred due to external foreign particles. According to embodiments described herein, the bus-bar and the terminals can be stably protected from external impact and a stable contact between the bus-bar and the terminals can be maintained.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
a plurality of rechargeable batteries respectively including externally protruding terminals;
a bus-bar electrically coupling at least two of the terminals of the rechargeable batteries; and
a protection member between the bus-bar and the rechargeable batteries, and including a support plate disposed on a case of the rechargeable batteries, the support plate including holes through which the terminals extend, and a protruding portion disposed along a circumference of the bus-bar, wherein the protruding portion includes:

a protection protrusion surrounding the bus-bar and including a gap, and
a guiding protrusion extending from ends of the protection protrusion corresponding to the gap toward a center of the support plate in a width direction.

2. The battery module as claimed in claim 1, further comprising a housing in which the rechargeable batteries are installed,
wherein the protection member is disposed on the housing.

3. The battery module as claimed in claim 1, wherein the protruding portion is formed in the shape of a rib surrounding the bus-bar.

4. A battery module, comprising:
a plurality of rechargeable batteries respectively including externally protruding terminals;
a bus-bar electrically coupling at least two of the terminals of the rechargeable batteries; and
a protection member between the bus-bar and the rechargeable batteries, and including a protruding portion disposed along a circumference of the bus-bar, wherein the protection member includes an exhaust hole corresponding to an upper portion of an exhaust member formed in the rechargeable battery.

5. The battery module as claimed in claim 4, wherein an exhaust protrusion protrudes upward along a circumference of the exhaust hole.

6. The battery module as claimed in claim 4, further comprising a housing in which the rechargeable batteries are installed,
wherein the protection member is disposed on the housing.

7. The battery module as claimed in claim 4, wherein the protection member further includes a support plate disposed on a case of the rechargeable batteries, the support plate including holes through which the terminals extend.

8. The battery module as claimed in claim 4, wherein the protruding portion is formed in the shape of a rib surrounding the bus-bar.

9. A battery module, comprising:
a plurality of rechargeable batteries respectively including externally protruding terminals;
a bus-bar electrically coupling at least two of the terminals of the rechargeable batteries; and
a protection member between the bus-bar and the rechargeable batteries, and including a protruding portion disposed along a circumference of the bus-bar, wherein:
the protection member further includes a support plate disposed on a case of the rechargeable batteries,
the support plate includes holes through which the terminals extend, and
the support plate includes a pressing protrusion contacting a bottom surface of the bus-bar.

10. The battery module as claimed in claim 9, wherein an end portion of the pressing protrusion protrudes farther in a direction of an end portion of one of the terminals than a bottom side of a portion of the bus-bar that contacts the terminal.

11. The battery module as claimed in claim 9, wherein the bus-bar is bent by the pressing protrusion.

12. The battery module as claimed in claim 9, wherein a shear stress is applied to the bus-bar by the pressing protrusion.

13. The battery module as claimed in claim 9, wherein two pressing protrusions are separately disposed from each other under one bus-bar.

14. The battery module as claimed in claim 9, wherein:
the bus-bar electrically couples four or more rechargeable batteries, and
a height of a pressing protrusion pressing an end side of the bus-bar in a length direction is higher than a height of a pressing protrusion pressing a center portion of the bus-bar in the length direction.

15. The battery module as claimed in claim 9, wherein the bus-bar is deformed by a plurality of pressing protrusions, and
when a strain at a center portion of the bus-bar is represented by "em", a strain at an edge that is disposed further to a side than the center portion in a length direction of the bus-bar is represented by "es", and a strain in elastic limit is represented by "el," em, es and el satisfy the relation:

$$em<es<el.$$

16. The battery module as claimed in claim 9, wherein the bus-bar is deformed by a plurality of pressing protrusions including first pressing protrusions and at least one second pressing protrusion, the first protrusions being at respective end regions of the bus-bar in a length direction of the bus-bar and the second protrusion being at a center region between the first protrusions, and
when an angle formed by the bus-bar and a plane that is parallel with an upper side of the support plate at a portion where the bus-bar and one of the first pressing protrusion contact each other is an angle represented by "a1" and an angle formed by the bus-bar and the support plate at a portion where the bus-bar and one of the second pressing protrusion is an angle represented by "a2," a1 and a2 satisfy the relation:

$$a2<a1.$$

17. The battery module as claimed in claim 9, wherein the bus-bar includes holes through which the terminals are inserted, a bottom side of the bus-bar contacts a base member fixed one of the terminals, and an upper side of the bus-bar contacts a nut fastened to the one of the terminals.

18. The battery module as claimed in claim 17, wherein the pressing protrusion protrudes farther to a direction toward an end portion of the one of the terminals than an upper side of the base member.

19. The battery module as claimed in claim 9, further comprising a housing in which the rechargeable batteries are installed,
wherein the protection member is disposed on the housing.

20. The battery module as claimed in claim 9, wherein the protection member further includes a support plate disposed on a case of the rechargeable batteries, the support plate including holes through which the terminals extend.

21. The battery module as claimed in claim 9, wherein the protruding portion is formed in the shape of a rib surrounding the bus-bar.

* * * * *